US008194965B2

(12) United States Patent
Lossev et al.

(10) Patent No.: US 8,194,965 B2
(45) Date of Patent: Jun. 5, 2012

(54) METHOD AND SYSTEM OF PROVIDING A PROBABILITY DISTRIBUTION TO AID THE DETECTION OF TUMORS IN MAMMOGRAM IMAGES

(75) Inventors: Ilia Lossev, Boulder, CO (US); Natasha Bogotskaya, Boulder, CO (US)

(73) Assignee: Parascript, LLC, Longmont, CO (US)

( * ) Notice: Subject to any disclaimer, the term of this patent is extended or adjusted under 35 U.S.C. 154(b) by 1098 days.

(21) Appl. No.: 11/942,641

(22) Filed: Nov. 19, 2007

(65) Prior Publication Data

US 2009/0129655 A1   May 21, 2009

(51) Int. Cl.
*G06K 9/00* (2006.01)
(52) U.S. Cl. .................. 382/132; 382/128; 382/224
(58) Field of Classification Search .................. 382/100, 382/132, 224
See application file for complete search history.

(56) References Cited

U.S. PATENT DOCUMENTS

| | | | |
|---|---|---|---|
| 5,212,637 A | 5/1993 | Saxena | |
| 6,266,435 B1 | 7/2001 | Wang | |
| 6,477,262 B2 | 11/2002 | Wang | |
| 6,574,357 B2 | 6/2003 | Wang | |
| 7,792,348 B2 * | 9/2010 | Russakoff | 382/132 |
| 2006/0210131 A1 * | 9/2006 | Wheeler et al. | 382/128 |
| 2008/0292194 A1 * | 11/2008 | Schmidt et al. | 382/217 |
| 2009/0185732 A1 * | 7/2009 | Zhang et al. | 382/132 |
| 2011/0176710 A1 * | 7/2011 | Mattiuzzi et al. | 382/128 |

OTHER PUBLICATIONS

Xu et al., "A Novel Masses Detection Algorithm Using Model-based Location and ANFIS-based Segmentation" International Symposium on Biophotonics, Nanophotonics and Metamaterials, 2006. Metamaterials, Oct. 2006.*
Hachama, Mohamed, "A Probabilistic Approach for the Simultaneous Mammogram Registration and Abnormality Detection", Lecture Notes in Computer Science, vol. 4046/2006, pp. 205-212 (Sep. 29, 2006).
Kumar, Sanjiv, "Models for Learning Spatial Interactions in Natural Images for Context-Based Classification", The Robotics Institute School of Computer Science Carnegie Mellon University, Tech. Report CMU—CS-05-08 (Aug. 2005).
Richard, Frederic J.P., "The Design of a Markovian Image-Matching Technique and its Comparison to a Variational Technique in the Context of Mammogram Registration", Pattern Recognition Letters, vol. 26, Issue 12 (Sep. 2005).

* cited by examiner

*Primary Examiner* — Stephen R Koziol
(74) *Attorney, Agent, or Firm* — Merchant & Gould, P.C.

(57) ABSTRACT

Methods and systems are disclosed to aid in the detection of cancer or lesion in a mammogram images. Two mammogram images are input into an application that aids in determining the probability of a cancer or lesion being present in one or both of the images. The images are divided into different nodes and labels are applied to the nodes. The first node is compared to different variants of corresponding nodes on the second image as well as neighboring nodes on the first image. Based upon the comparisons, a unary and binary potential is calculated for the label that is applied to the node. The process is repeated for every possible label and for every node. Once the unary and binary potentials have been calculated, the potentials are input into a Conditional Random Field model to determine the probability of cancer for each node of the images.

14 Claims, 7 Drawing Sheets

METHOD AND SYSTEM OF PROVIDING A PROBABILITY DISTRIBUTION TO AID THE DETECTION OF TUMORS IN MAMMOGRAM IMAGES

BACKGROUND

Early detection of cancer is important to providing the best care and best possible outcome to cancer patients. As such, methods of cancer screening have been developed and are regularly practiced by physicians. Some methods of cancer screening involve the use of medical imaging to determine whether a person has or is developing cancer. In the case of breast cancer, a mammography machine is used to take images of a woman's breasts. Mammogram images are generally analyzed by physicians who determine whether or not cancer exists in patients. However, such analysis may be incorrect as a result of human error, thus resulting in a false positive (incorrectly identifying cancer when it does not exist) or false negative (failing to identify cancer when it exists) diagnosis. Computer applications may be used to help mitigate the chance of human error. It is with respect to this general environment that embodiments of the present invention have been contemplated.

SUMMARY

Embodiments of the present invention are directed to methods and systems to detect tumors in mammogram images. In embodiments of the present disclosure, tumors or lesions are detected by comparing mammogram images of two breasts of the same person or images of the same breast taken at two different points in time. In embodiments, the image is divided into nodes. The probability of each node depicting an instance of cancer or normal tissue is determined. That determination is driven by accounting for multiple variables relating to the node, other nodes on the same image, and nodes on the second image. In embodiments, a method is defined in which a node is simultaneously: (a) labeled as a cancer or normal, and (b) mapped to a node on the other image. The method iterates through all applicable steps (e.g., switch the label, map to a different node on the corresponding image) for each node. In doing so, the method compares the local features of each node to typical cancer features as well as comparing local features of two nodes on different images mapped onto each other. The method also compares the labeling and mapping of a node to that of neighboring nodes on the same image. The results of all of these comparisons are input as unary and binary potentials into a Conditional Random Field ("CRF") model. The method uses a new, efficient algorithm with the framework of the CRF model to approximate a Posterior Marginal Probability that a particular node contains a lesion or cancer. The resulting probability takes into account the information of a first image as well as information gleaned through different variants of comparisons between two images in order to account for all possible deformations present in each image (e.g., all possible mappings of one image into the other).

In embodiments, combined labels are applied to each node of the first image. Each combined label is a combination of a mapping label, which determines a corresponding node on the second image, and a classification label, which "determines or indicates" whether cancer exists in the node of the first image and/or the corresponding node of the second image.

In embodiments, a unary potential is calculated for each combined label applied to each node of the image. The unary potential describes an applicable penalty for every value of a classification label and every possible mapping assigned to each node. In embodiments, the unary potential of each node is determined using the features of the node on the first image and the features of the respective ("mapped-to") node on the second image.

In embodiments, a binary potential is calculated for each pair of neighboring nodes in the first image and each pair of combined labels applied to these two neighboring nodes. The binary potential is used for smoothing the classification of a node on the first image and smoothing the mapping of the node to a node on the second image.

In further embodiments, the unary and binary potentials of each node are used as inputs in a Conditional Random Field discriminative probability model. In such embodiments, the CRF model computes a probability for each node of containing a lesion or cancer to aid in determining the best classification label for each node. Because taking into account a large number of possible mappings for each node makes known algorithms of inference using the CRF framework prohibitive due to time restrictions, in an embodiment, an iterative algorithm is used for a fast approximation of pathology probability. This probability can be used in making a final inference (e.g., assigning the best classification label to each node).

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Embodiments of the present invention may be more readily described by reference to the accompanying drawings in which like numbers refer to like items and in which.

DETAILED DESCRIPTION

Figure 1:
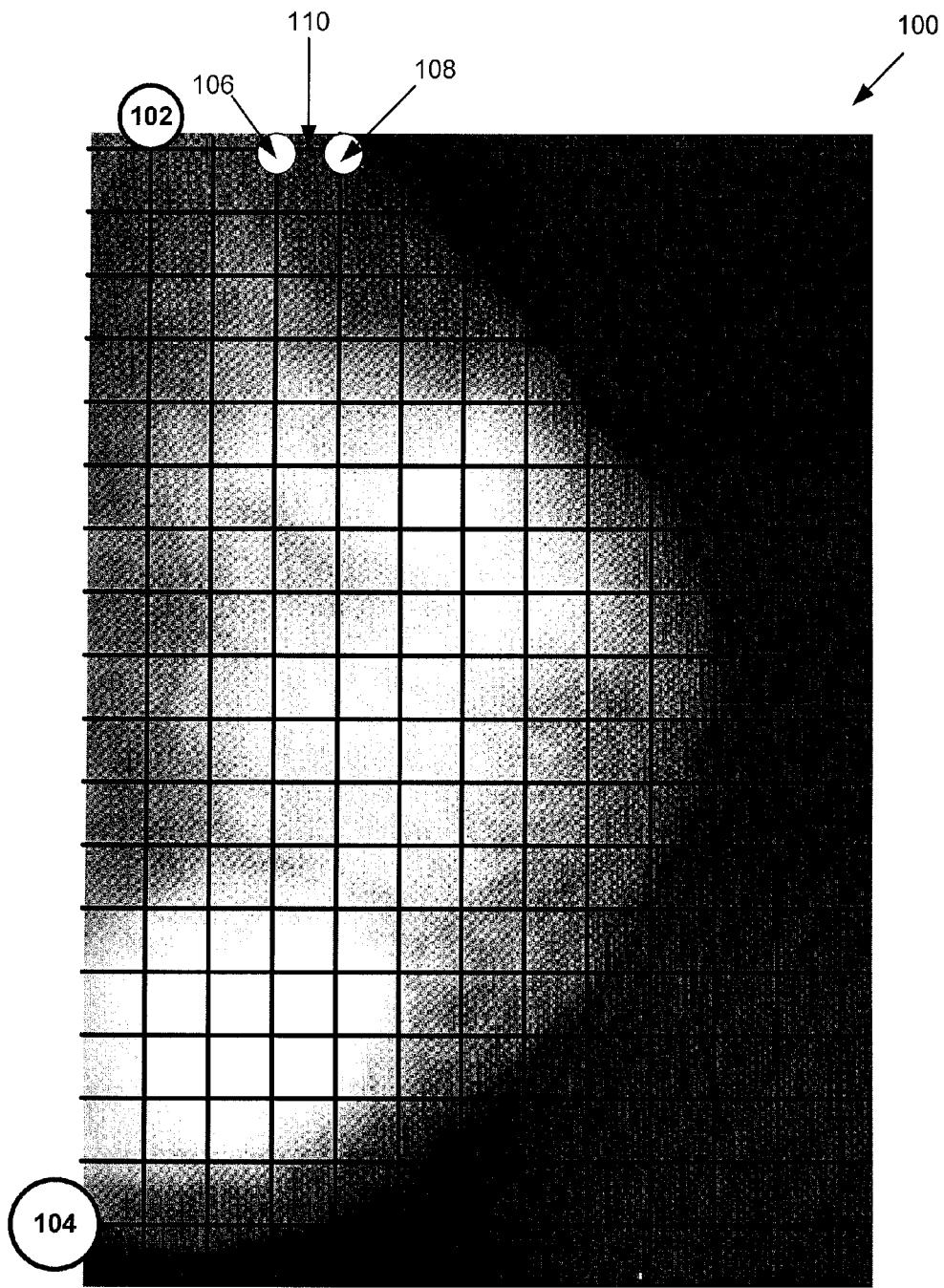
FIG. 1 is an a mammogram image divided into nodes according to embodiments disclosed herein.

This disclosure will now more fully describe exemplary embodiments with reference to the accompanying drawings, in which some of the possible embodiments are shown. Other aspects, however, may be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments of the present disclosure relate to detecting tumors in mammogram images. The methods and systems disclosed compare the features of two mammogram images to produce a probability distribution related to the likelihood that a portion of the image displays a mass of cancer cells. In embodiments, a method is defined in which a node is simultaneously: (a) labeled as a cancer or normal, and (b) mapped to a node on the other image. The method iterates through all applicable steps (e.g., switch the label, map to a different node on the corresponding image) for each node. The method compares the similarity of the local features of each node on the image to typical or known cancer features, as well as comparing the similarity between the local features of a node on a first image to a mapped node on a second image. The method also compares the labeling and the mapping of a node to neighboring nodes on the same image. The results of all of these comparisons are input as unary and binary potentials into a CRF model. In embodiments, the method uses an efficient algorithm within the framework of CRF model to approximate a Posterior Marginal Probability that a particular node contains a lesion or cancer. The resulting probability takes into account the information of a first image as well as information gleaned through different variants of comparisons between two images in order to account for all possible deformations present in each image (e.g., all possible mappings of one image into the other).

In embodiments, the resulting probability distribution is used in determining whether or not cancer is present in one or both of the mammogram images. In other embodiments, the methods and systems disclosed are used to detect lesions, calcifications, tumors, cysts, or other ailments, each of which terms are used interchangeably herein. While certain methods and systems disclosed herein may be directed towards detecting cancer in mammogram images, one skilled in the art will recognize that the methods and systems may also be practiced on X-ray images, computer axial tomography ("CAT") scans, magnetic resonance imaging ("MRI's"), or any other type of medical imaging. In embodiments, the methods and systems may also be practiced when two input images of the system are not two breasts of the same person, but two images one breast taken at different moments in time. In further embodiments, the methods and systems disclosed herein may be applied to images of any organ or tissue to aid in pathology.

Referring now to FIG. 1, a mammogram image 100 is illustrated. Generally, mammogram images are X-ray images of a breast produced by a mammography machine. Mammograms may be performed using screen-film cassettes or digitally in a process known as Full Field Digital Mammography. One skilled in the art will readily appreciate that the methods and systems disclosed operate regardless of the method used in producing the mammogram image 100. In embodiments, mammogram images, such as mammogram image 100, are used as inputs to the disclosed methods and systems. Upon receiving mammogram image 100, the image is divided into nodes, such as node 106. In one embodiment, the image may be divided into a grid by vertical lines, such as vertical line 102, and horizontal lines, such as horizontal line 104. Each node may be designated by a cell in the grid. In embodiments, the image is divided into nodes such that each pixel representing the image corresponds to a node. In embodiments, the disclosed methods and systems perform various operations and calculations upon the nodes, discussed below in relation to FIGS. 3-6, to determine whether the node depicts a tumor.

In embodiments, nodes, such as node 106 and node 108, are assigned a label. In embodiments, labels consist of two parts: a classification label and a mapping label. In embodiments, a classification label classifies a node as embodying a certain classification, e.g. cancer or normal. In embodiments, a mapping label assigned to a node is a vector that determines a mapping to a node on the second image. In embodiments, classification labels are used to characterize nodes. For example, each classification label may have two values, e.g., cancer\non-cancer or tumor\normal. In other embodiments, multiple classification labels can be used to simultaneously characterize an individual node of a first mammography image and a respective node on a second mammography image. Ultimately, the number and types of classification labels used are determined based upon the underlying algorithm employed to detect image anomalies. For example, different classification labels may be applied for detecting cancer, lesions, calcifications, or other ailments. In embodiments, mapping labels describe a translation applied to a node in order to map the node to a node on another image. Translations and the process of mapping are further described with reference to FIGS. 2 and 5.

In embodiments, the methods and systems disclosed herein calculate potentials for each node, such as node 106 and node 108. In embodiment, potentials are calculated and assigned to nodes as penalties used in determining a proper classification label for the nodes. For example, a unary potential of a particular classification label value (e.g., cancer or normal) assigned to nodes is affected by the characteristics of the two mammography images. In embodiments, characteristics such as intensity, gradient of intensity, or contrast may be used to determine the likelihood of a node being correctly classified as cancer or normal. In other embodiments, characteristics may also include general features of the image such as average intensity and average contrast of the image. In further embodiments, pattern recognition, digital geometry, signal processing, or any other process of image detection or analysis known to the art may be used to assign penalties to different classification labels of a node. In embodiments, every applicable label is applied to a node, such as node 106, and the potential or penalty applicable to each label is calculated for each node. Calculating the unary potential is described with reference to FIGS. 3-4.

In embodiments, binary potentials may be calculated based upon the relationship between nodes. For instance, while unary potentials may be calculated for each node 106 and 108, a binary potential is calculated for the relationship between nodes 106 and 108. The relationship between nodes 106 and 108 is illustrated by edge 112. Calculating binary potential is further described with reference to FIGS. 3 and 5.

Figure 2:
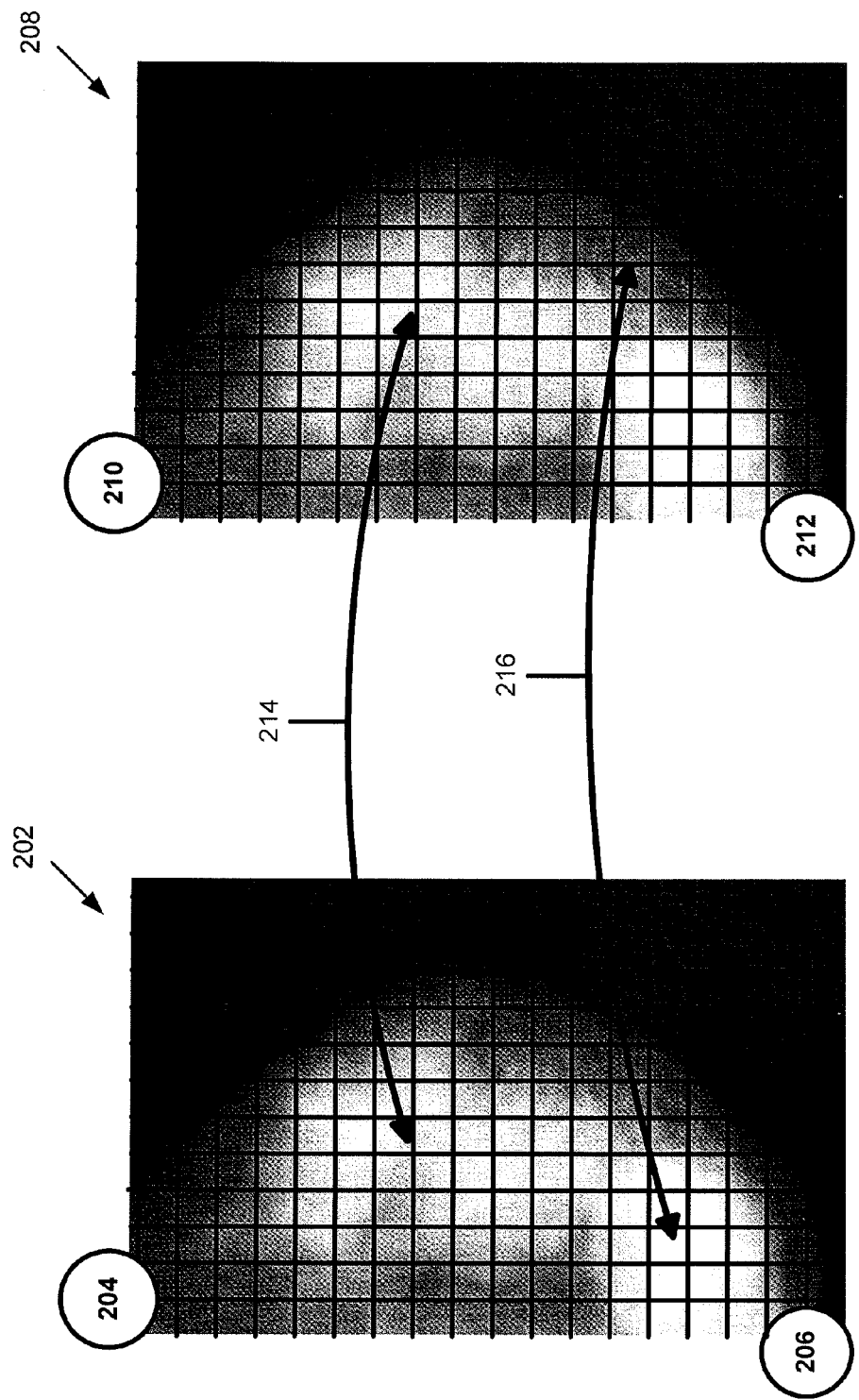
FIG. 2 depicts two mammogram images illustrating the mapping of nodes between the images, as taught in embodiments of the present disclosure.

FIG. 2 illustrates an embodiment of two mammogram images that may be used in embodiments of the present disclosure. In embodiments, a first mammogram image 202 and a second mammogram image 208 are compared to determine a probability distribution related to whether a tumor exists in the first image. Each mammogram image 202 and 208 may be divided into separate nodes, such as nodes 106 and 108 (FIG. 1). The nodes may be determined by a grid, as demonstrated by grid lines 204, 206, 210, and 212. In other embodiments, each node may correspond to the individual pixels that make up mammogram images 202 and 208. In one embodiment, the first mammogram image 202 is a mammogram of a woman's left breast while the second mammogram image 208 is an mammogram of her right breast, or vice versa. In this embodiment, characteristics of one breast are compared to the characteristics of the other breast. For example, if a node in the first mammogram image 202 is labeled as non-cancer its characteristics are compared to characteristics of a corresponding node in the second mammogram image 208. In embodiments where the node is mapped to a node in the second image, the mapping label representing the node is a vector, such as vector 214. In embodiments, a label represented as a vector comprises four values, a pair of values representing classification labels (e.g., classifying a node in the first image as cancer or normal, e.g., $c_1$, and classifying a corresponding node in the second image as cancer or normal, e.g., $c_2$), a x-axis translation describing a change in position along the x-axis of the node from the first image 202 to a corresponding node in the second image 208 (e.g., dx), and a y-axis translation describing a change in position along the y-axis of the node from the first image 202 to a corresponding node in the second image 208 (e.g., dy). Thus, a label may be defined by the formula $l=\{c_1, c_2, dx, dy\}$, where the variable l stands for a mapping label.

In embodiments, a comparison is accomplished by mapping the node in the first mammogram image 202 to corresponding node(s) in the second mammogram image 208, as illustrated by vector 214. It is highly unlikely that cancer would be present in the same location in both the left and right breast. Thus, if a node in the first mammogram image 202 has similar characteristics to a corresponding node on the second mammogram image 208, there is a higher probability that both nodes are non-cancer.

In embodiments, a node in the first mammogram image 202 is compared to different nodes within a predetermined region of the second mammogram image 208. In embodiments, the predetermined region is defined as a region surrounding the node on the second image which has the same coordinates as the first node on the first image. Different variants of correspondence between the nodes account for different possibilities of small deformations present in each breast as a result of the mammography process. Vector 216 illustrates a mapping of a node in the first mammogram image 202 to a node within a predetermined region in the second mammogram image 208. In embodiments, the predetermined region is small, as discussed further with reference to FIG. 5. Larger predetermined regions lead to less accurate results as well as a greater burden on processing resources.

In other embodiments, the second mammogram image 208 is a mammogram image of the same breast depicted in mammogram image 202 taken at a later point in time. Comparison of the same breast at different times allows for a more accurate determination of the existence of a tumor because natural differences between a left and right breast do not need to be accounted for.

Figure 3:
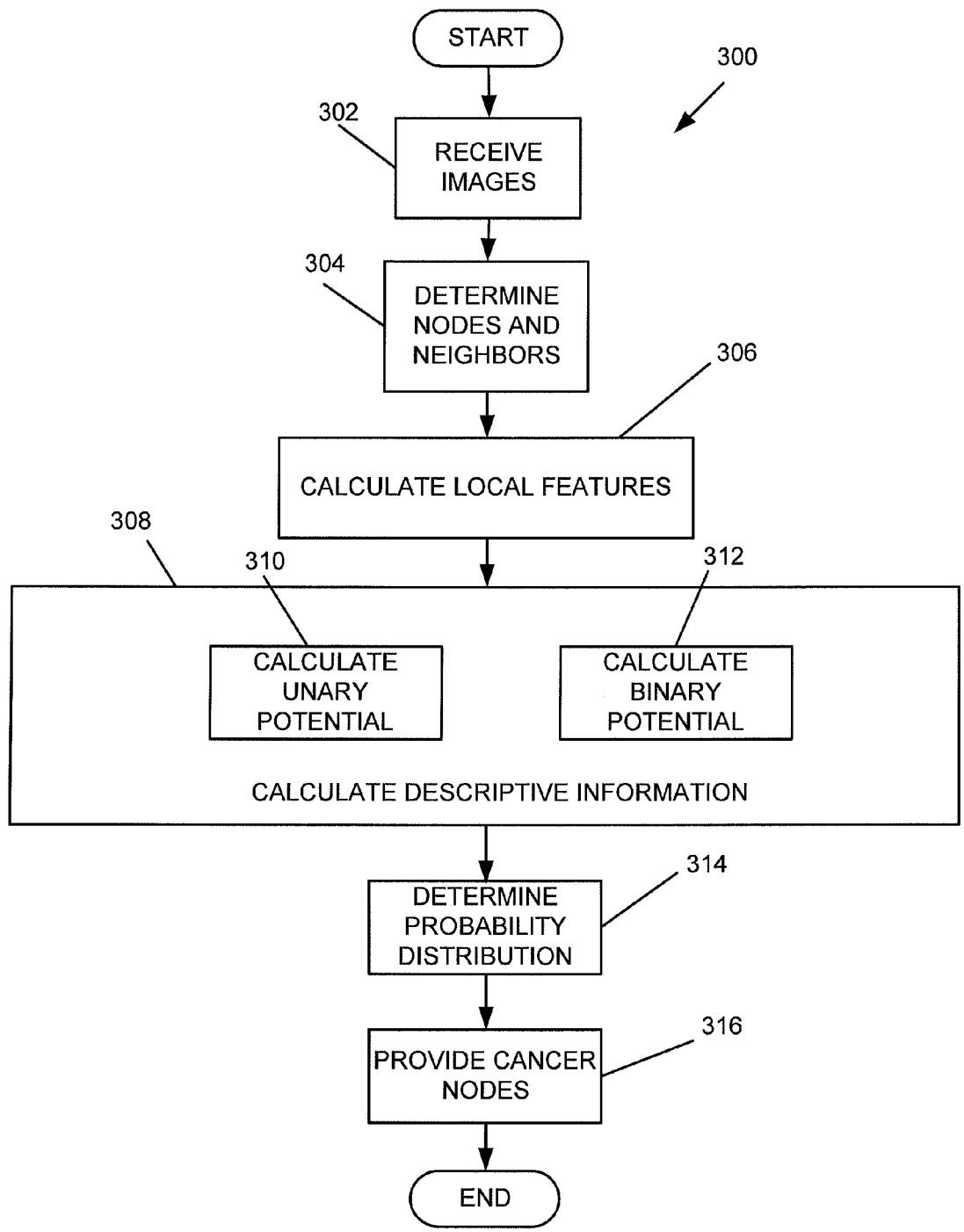
FIG. 3 is a flow diagram representing an embodiment of a method 300 for providing a probability distribution that is used in determining whether an instance of cancer exists using two mammogram images.

Referring now to FIG. 3, a flow diagram representing an embodiment of a method 300 for providing a probability distribution that is used in determining whether an instance of cancer exists in a mammogram image using two mammogram images is illustrated. At receive images operation 302, the method receives mammogram images for analysis. In one embodiment, the method receives two mammogram images, such as the first mammogram image 202 (FIG. 2) and the second mammogram image 208 (FIG. 2). At determine nodes operation 304, each mammogram image is divided into a set of nodes. In one embodiment, nodes may be arbitrarily created, for example, by superimposing a rectangular grid over each image. In other embodiments, each node corresponds to a pixel representing the image. In one embodiment, determine nodes and neighbors operation also determines a set of neighbors for each node. A set of neighbors for each node may consist of its up-down and left-right neighbors in the grid. In other embodiment, a set of neighbors may include diagonal neighbors in the grid. In embodiments, an arbitrary graph may be superimposed over an image, edges of this graph indicating pair of nodes which are considered to be neighbors. FIGS. 1 and 2 are not drawn to scale and considerably more nodes per image may be employed in embodiments.

After dividing the mammogram images into nodes and determining a predefined region of neighbors, flow proceeds to calculate local features operation 306. At this point, each node is analyzed to determine its features. In embodiments, the features of the node may be based upon intensity, the gradient of intensity, contrast, etc. In other embodiments, the features may be calculated for a neighborhood of nodes surrounding the node on the image. While the embodiment has been described using these features, one skilled in the art will recognize that other features of the image may be analyzed. In some embodiments, the image is analyzed resulting in a feature list for each node. In embodiments, these features may be used to compare a node on a first image to a node on a second image or to compare the node on a first image or a corresponding node on a second image to a typical cancer node.

After calculating the local feature, flow proceeds to operation 308. In the embodiment shown in FIG. 3, calculate descriptive information operation 308 comprises two operations, calculate unary potential operation 310 and calculate binary potential operation 312. In embodiments, calculate descriptive information operation may comprise calculating other type of information, such as intensity, gradient of intensity, contrast, etc. Calculate unary potential operation 310 is further described in FIG. 4. Calculate binary potential operation 312 is further described with reference to FIG. 5. While the embodiment described with regard to FIG. 3 illustrates two operations performed in operation 308, one skilled in the art will appreciate that any number of calculations may be performed in operation 308. (e.g., other calculations described herein with respect to the disclosed systems and methods may be simultaneously calculated in step 308). In further embodiments, the unary potential operation 310 is performed for every node of the first image and binary potential operation 312 is performed for every pair of neighboring nodes of the first image received operation 302.

Flow proceeds to determine probability distribution operation 314. Determine probability distribution operation 314 receives the results and/or functions that are generated in operation 308 as inputs and derives a probability distribution. For example, in embodiments the unary and binary potentials, determined in steps 310 and 312 respectively, may be used as inputs to determine probability operation 312. In other embodiments, determine probability distribution operation 312 may receive inputs from any other calculation taking place in operations 306 or 308.

In embodiments, determine probability operation 314 uses a probabilistic model to produce a Posterior Marginal Probability function, for example a Markov Random Field ("MRF") or any other probabilistic model known in the art. In other embodiments, a Conditional Random Field is used to produce the Posterior Marginal Probability distribution, as explained further with regards to FIG. 6. Because a mapping is included in a label, the number of possible labels is fairly large, which, in turn, makes known algorithms for the calculation of a Posterior Marginal Probability function and/or the use of an inference in the CRF framework (such as Loopy Belief Propagation and Iterative Conditional Mode) prohibitive due to time constraints.

In an embodiment, an original iterative algorithm for fast approximate calculation of Posterior Marginal Probability of labels for each node is used. In embodiments, the iterative algorithm makes use of different divisions (or "cuttings") of a CRF graph (which consists of nodes corresponding to the first image and edges between neighboring nodes, such as nodes 106 and 108 and edge 110) into a sequence of acyclic subgraphs. In one embodiment, the subgraphs may comprise divisions along vertical or horizontal lines. In embodiments, an iteration of the algorithm consists of a sequence of calculations upon each subgraph in turn. The calculation proceeds under the assumption that an approximation of the Posterior Marginal Probabilities of nodes in the remaining part of the graph has already been calculated. In other embodiments, versions of the algorithms that calculate Posterior Max-Marginal Probabilities and/or the most probable label assignments assume that the most probable labels have already been assigned and fixed to the remaining part of the graph. Under these assumptions, the algorithm makes use of the acyclicity of chosen subgraph and of the fact that a Dynamic Programming method can efficiently and exactly calculate the Posterior Marginal Probability (or the most probable label assignment) for any acyclic subgraph. After applying a Dynamic Programming method to the subgraph (e.g., a horizontal line across the image), the calculated values are stored and used in calculations upon the next subgraph (e.g., the next horizontal line). In embodiments, the iterations are repeated for all subgraphs in a division (e.g., all horizontal lines). In other embodiments, iterations of the algorithm may alternate between different divisions, for instance, after completing an iteration upon a division comprising horizontal lines, the next iteration is performed upon a division made up of vertical lines. The use of Dynamic Programming for large acyclic (e.g., linear) subgraphs allows for a substantial reduction in the number of iterations necessary to perform convergence comparisons using other algorithms known in the art (e.g., Loopy Belief Propagation algorithm and Iterative Conditional Mode algorithm).

In embodiments, after calculating the Posterior Marginal Probability of labels for each node of the first image, a marginalization is made over all of the mappings of each node in the first image and over all possible label assignments in corresponding nodes on the second image resulting in a Posterior Marginal Probability of a classification for each node.

Flow then proceeds to provide cancer nodes function 316 where, in embodiments, an inference is made about existence of cancer and, if it does exist, the location of the cancer on the mammography image. In embodiments, the inference can be made by defining a threshold and labeling as cancer all nodes with Posterior Marginal Probability of cancer greater than the defined threshold. In other embodiments, the most probable label is chosen for each node and only nodes where classification part of the most probable label is "cancer" are marked as cancer. These results can be provided or displayed to a user or another application.

Figure 4:
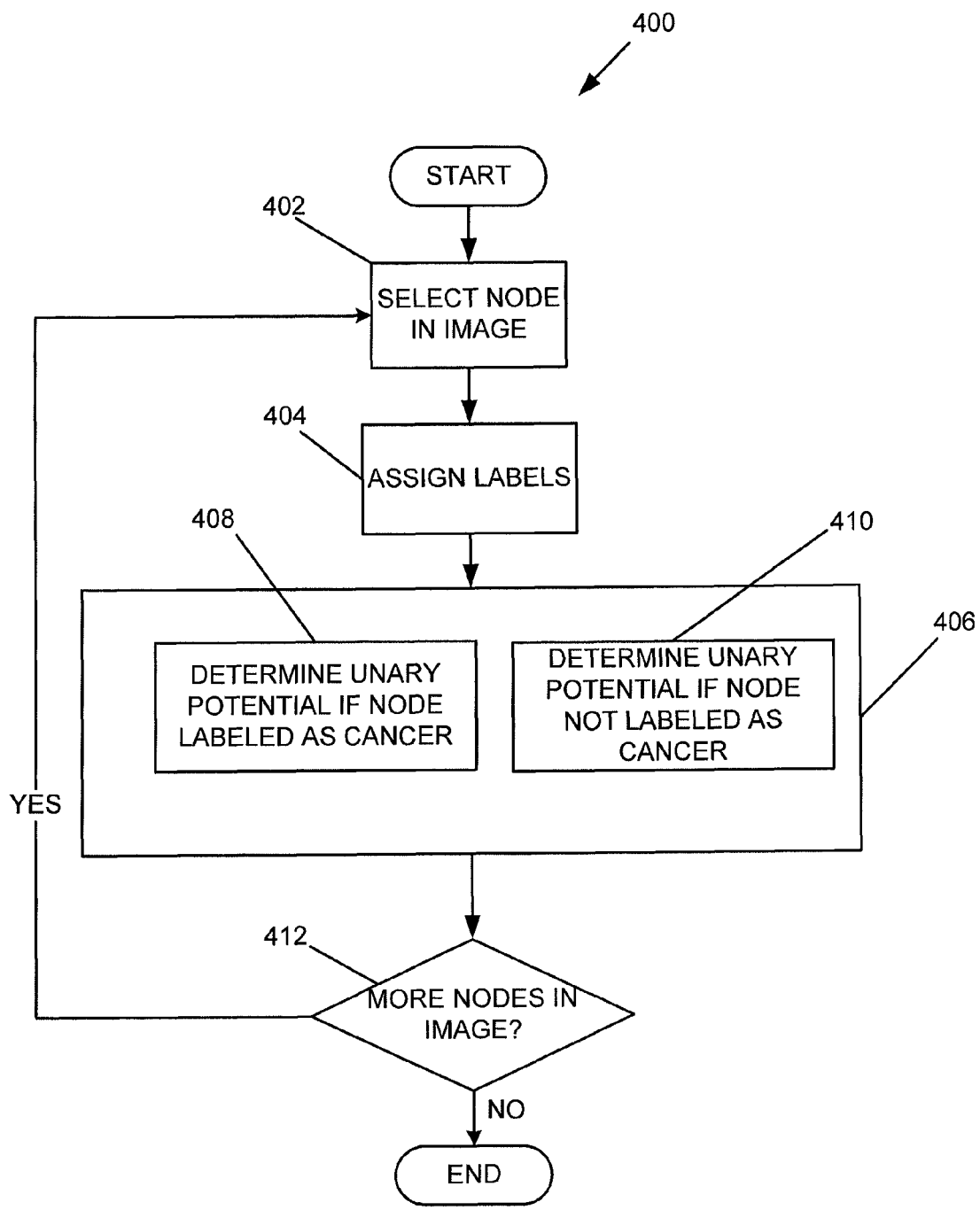
FIG. 4 is a flow diagram representing an embodiment of a method for defining the unary potential of a node.

FIG. 4 is a flow diagram illustrating an embodiment of a method 400 for defining the unary potential of a node. In an embodiment, the unary potential for each node of the first image is determined in calculation operation 406 (FIG. 4). In embodiments the value of the unary potential of the node will be calculated for every possible label applicable to the node. While an unlimited amount of labels can be applied to each node, in an embodiment, a single ternary classification label is applied to a node, for example, cancer in a first node on the first image and no cancer in the corresponding node of the second image, no cancer in the first node and no cancer in the corresponding node of the second image, cancer in the first node and cancer in the corresponding node of the second image, and no cancer in the first node and cancer in the corresponding node of the second image. In embodiments, the corresponding node on the second image is determined by a mapping part of the label, which may be different for different mappings. For example, for a given first node on the first image, a predetermined region of nodes in the second mammogram image where the first node can be mapped may consists of 49 nodes (7 possible shifts along x-axis and 7 possible shifts along y-axis). In this instance, the unary potential must be computed for 4 classification labels multiplied by 49 variants of mapping labels, thus resulting in 196 different possible label calculations for the first node in the first image. In embodiments, this number also affects the number of calculations needed to calculate binary potential. In embodiments, binary potential is determined by labels of two neighboring nodes of the first image. If each node has one of 196 different labels then the number of different label assignments for two neighbor nodes is equal to 196 multiplied by 196, resulting in a large number of binary potential calculations. Calculating binary potentials is described further with regards to FIG. 5. In embodiments, the iterative algorithm is utilized to reduce the number of calculations.

Flow begins at select node in image operation 402, where a node is selected from the first mammogram image. Once a node is selected, flow proceeds to assign labels operation 404. Because the unary potential is defined for every label, every possible label is assigned to the selected node in operation 404. In one embodiment, labels are individually assigned and the unary potential is calculated. After calculating the unary potential for the node with the label (e.g., cancer), a new label (e.g., normal) is assigned to the node and the unary potential is again calculated for the new label This process is repeated until all labels for all nodes have been exhausted for each image.

Flow proceeds to operation 406, where unary potential for each label is determined. In embodiments, unary potential is calculated by different formulas depending on classification part of a label, as described in operations 408 and 410.

Operation 408 calculates the unary potential for a label applied to the selected node on the first image if the selected node on the first image or a corresponding node on the second image or both nodes are labeled as cancer. In one embodiment, the unary potential U of a label l classifying the selected node in the first image as cancer is calculated with the following formula:

If $I_{x,y} < I_{canc}$ then $U = (I_{x,y} - I_{canc})^2 / (\sigma_{canc})^2$

If $I_{x,y} > I_{canc}$ then $U = 0$ where $I_{x,y}$ is the intensity of a node identified by its x,y coordinate position on the first image, $I_{canc}$ is the lower limit of typical cancer intensities range where typical cancer intensities range is known, and $\sigma_{canc}$ is a known constant. The unary potential U of a label l in a node where classification part of label l corresponds to cancer in the corresponding node on the second image is calculated with the following formula:

If $I_{x+dx,y+dy} < I_{canc}$ then $U = (I_{x+dx,y+dy} - I_{canc})^2 / (\sigma_{canc})^2$ If $I_{x+dx,y+dy} > I_{canc}$ then $U = 0$ where $I_{x+dx,y+dy}$ is the intensity of the corresponding node identified by its x+dx, y+dy coordinate position on the second image and dx and dy are x-axis translation and y-axis translation portions of the mapping part of the label l. The unary potential U of a label l in a node where the classification part of label l corresponds to cancer in the node on the first image as well as in the corresponding node on the second image is equal to the sum of the two formulas.

Although one embodiment is described using intensity as the node's feature characteristic, one skilled in the art will recognize that other features of the node may be used to calculate the unary potential. In embodiments where other features are used, different formulas known in the art may be employed to calculate the unary potential. In embodiments, a local recognizer configured to recognize cancer based on the features of a node can be used to calculate unary potential. Types of local recognizers are known in the art.

The previously described formulas provide a penalty related to the likelihood that the features of the node are similar to features of cancer. For example, when intensity is the feature measured, if typical intensities of cancer are known, $I_{canc}$ may be a constant that corresponds to the lower limit of a typical cancer intensity range, in which case the formula results in a comparison of how close the node's feature resembles that of cancer. In other embodiments, $I_{canc}$ may depend on the features of the image or images. For instance, the intensity of the node may be compared to an average intensity of the image or images as a whole. In such an embodiment, because the greater portion of the image is most likely not cancer, if the intensity of the node is not significantly greater than the average intensity of the entire image, it is unlikely that the node depicts an instance of cancer.

Operation 410 calculates the unary potential for a label applied to selected node assuming it classifies both the selected node and a corresponding node on the second image as normal. In this case, the unary potential is computed by the following formula:

$$(I_{x,y} - I_{x+dx, y+dy})^2 / (\sigma_{sim})^2$$

where $I_{x,y}$ is the intensity of the node on the first image identified by its x,y coordinate position and $I_{x+dx, y+dy}$ is the intensity of the corresponding node on the second image identified by the translations dx and dy applied to the x,y coordinate of the selected node, and $\sigma_{sim}$ is an experimentally determined constant. An experimentally determined constant, in embodiments, is a constant that may be determined through a process of trial and error, training (e.g., a training process used with various images), or any other type of learning process known in the art. The formula compares the node on the first image with a corresponding node on the second image. If both nodes are not cancer, their relative intensities should be similar, thus resulting in a small number. In embodiments, the comparison is used to judge the probability that each node is correctly labeled. The result of the comparison may depend on the nature of the two images that are compared. In one embodiment, the two images may be a first image corresponding to a left breast and a second image corresponding to a right breast. In this embodiment, if the first and second images are locally similar in the neighborhoods of corresponding nodes, it is less probable that the image depicted in either of these two nodes is in fact cancer. This is because it is highly unlikely that cancer would develop in the same place in each breast.

While the unary potential has been defined in relation to a preferred embodiment of using a single ternary classification label (e.g., classification labels with two values for a node on the first image and two values for the corresponding node on the second image), one skilled in the art will appreciate that in other embodiments a unary potential can be calculated for any classification label applied to a node, including labels with more than two values for a node on the first image and for the corresponding node on the second image. Even if the number of labels changes, the unary potential may be calculated for a node until a unary potential has been defined for every possible combination of labels.

After calculating the unary potential for every label applicable to a node, flow proceeds to decision step 412 where a determination is made whether more nodes exist in the image. If a node exists for which the unary potential has not been determined, flow branches YES to step 402, the next node in the first image is selected, and the process of calculating unary potentials is repeated for the next node on the image. If unary potentials have been calculated for all nodes in the first image, flow branches NO and flow terminates.

Figure 5:
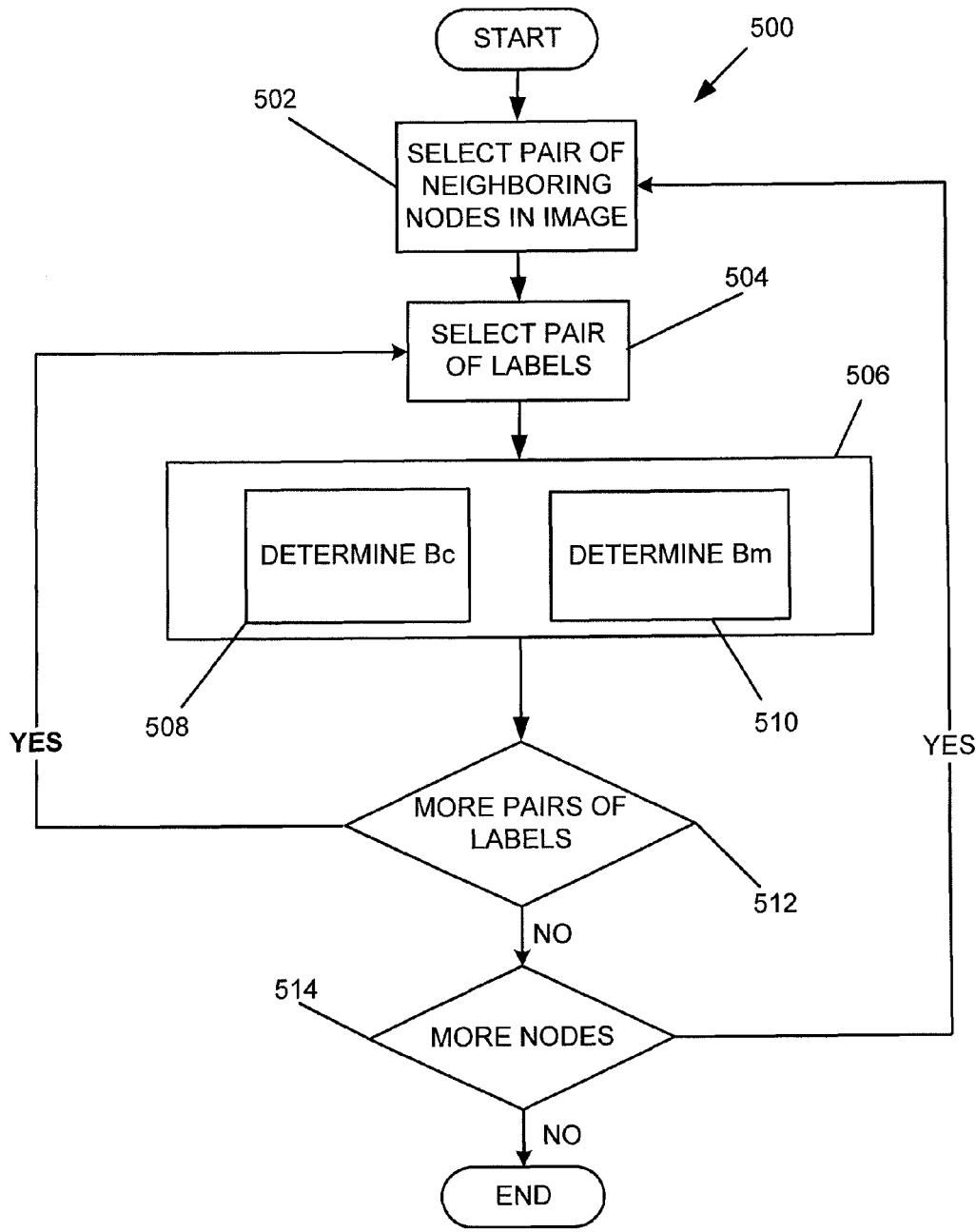
FIG. 5 is a flow diagram representing an embodiment of a method for determining the binary potential of two selected nodes.

Referring now to FIG. 5, a flow diagram representing an embodiment of a method 500 for determining the binary potential of two selected nodes is illustrated. While the unary potential is calculated relative to a single node, binary potential is calculated in regards to two nodes. In embodiments, the binary potential serves two functions. First, the binary potential is used to provide spatial smoothness of classification labels. The binary potential provides label smoothing by applying a penalty to a pair of non-coinciding classification labels in two neighboring nodes to decrease the number of cancer/non-cancer transitions between neighboring nodes. Second, the binary potential provides for smooth mapping. The binary potential provides for smooth mapping by ensuring that the translational shift from a node on the first image to a node on the second image is not too different from the translational shift applied to a neighboring node on the first image. For example, the binary potential will result in a large penalty if the shifts in two neighboring nodes differ greatly, thus resulting in a lower probability value.

Flow begins at select pair of neighboring nodes in image operation 502. In select two nodes in image operation 502, two nodes are selected from the same image, such as the first mammogram image 202 (FIG. 2). In embodiments, a first node is selected and then a second node is selected from within a set of neighbors of the first node. In embodiments, the neighborhood may be determined by a predefined tolerance of locality. In an embodiment, the image is previously divided into nodes and set of neighbors is determined for each node by determine node and neighbors operation 304 (FIG. 3).

Flow then proceeds to select pair of labels operation 504. Because the binary potential is calculated for every pair of labels, every pair of labels assignable to the selected nodes is assigned in operation 504. In one embodiment, labels are individually assigned and the binary potential is calculated. After calculating the binary potential related to the neighboring nodes with respective labels, a new pair of labels is assigned to the nodes and the binary potential is again calculated for the new pair. This process is repeated until all possible pairs of labels have been exhausted.

In compare label to neighbor's label operation 506, the labels of the selected nodes are compared to calculate a binary potential. In embodiments, the labels are represented in vector form. The first label $l_1$, is further defined as:

$$l_1 = \{c_{11}, c_{21}, dx_1, dy_1\}$$

where $c_{11}$ is a binary label for the node on the first image (e.g., cancer/normal), $c_{21}$ is a binary label (e.g., cancer/normal) for the corresponding node on the second image, $dx_1$ is a shift from a first node to a second node along the x-axis, and $dy_1$ is a shift from the first node to a second node along the y-axis. The second label $l_2$ (for a neighboring node) is defined as:

$$l_2 = \{c_{12}, c_{22}, dx_2, dy_2\}$$

where $c_{12}$ is a binary label (e.g., cancer/normal) for the neighboring node on the first image, $c_{22}$ is a binary label (e.g., cancer/normal) for the corresponding node on the second image, $dx_2$ is a shift from a first node to a second node along the x-axis. In embodiments, the binary potential for the pair of labels $(l_1, l_2)$ is calculated using the following formula:

$$B(l_1,l_2)=Bc(c_{11},c_{12},c_{21},c_{22})+Bm(dx_1,dy_1,dx_2,dy_2)$$

where $l_1$ and $l_2$ are labels that correspond to a selected first node and a selected second node, Bc is a classification part of binary potential which depends only on classification parts of corresponding labels (further described in operation 508) and Bm is a mapping part of binary potential which depends only on mapping (translational) parts of corresponding labels (further described in operation 510).

In Bc operation 508 the classification part of binary potential is calculated. The classification part of a label of the selected node is compared to classification parts of labels of neighboring nodes to ensure a smoothness of the resulting classification. For example, a node labeled as normal that is surrounded by nodes labeled as cancer is not likely to actually be normal tissue, the reason being that mass tumors usually form compact regions. In this case, a larger binary potential is determined, thus decreasing the probability that each of the neighboring nodes are properly labeled. Conversely, if the node's label matches that of the labels surrounding it, then it is more likely that the node is correctly labeled, a lower binary potential is determined, thus increasing the probability that each of the neighboring nodes are properly labeled.

In embodiments, the spatial smoothing of classification function for label $l_1$, of the first node and label $l_2$ of the second node is represented in vector form:

$$l_1=\{c_{11},c_{21},dx_1,dy_1\} \text{ and } l_2=\{c_{12},c_{22},dx_2,dy_2\}$$

is defined in the following way:

if $c_{11}=c_{12}$ and $c_{21}=c_{22}$ $Bc(c_{11},c_{12},c_{21},c_{22})=0$ if $c_{11}\neq c_{12}$ and $c_{11}\neq c_{12}$ $Bc(c_{11},c_{12},c_{21},c_{22})=2*P$ otherwise $Bc(c_{11},c_{12},c_{21},c_{22})=P$ where P is some experimentally chosen positive constant. An experimentally determined positive constant, in embodiments, is a positive constant that may be determined through a process of trial and error, training (e.g., a training process used with various images), or any other type of learning process known in the art.

In embodiments, Bm operation 510 calculates the mapping part of the binary potential to smooth the mapping of nodes from a first image to a second image. Smoothing the mapping of nodes ensures that nodes located close together in the first image are mapped such that their corresponding mappings to nodes on the second image are similarly located close together.

In embodiments, the map smoothing function for label l of the first node and label $l_2$ of the second node represented in vector form:

$$l_1=\{c_{11},c_{21},dx_1,dy_1\} \text{ and } l_2=\{c_{12},c_{22},dx_2,dy_2\} \text{ is defined as:}$$

$$Bm(dx_1,dy_1,dx_2,dy_2)=(dx_1-dx_2)^2+(dy_1-dy_2)^2$$

If the function results in a small value, the selected neighboring nodes in the first image were mapped closely together in the second image, thus resulting in a lower binary potential and a higher confidence in accurate comparisons. Conversely, if the function results in a large value, the selected nodes in the first image were not mapped closely together in the second image, thus resulting in a higher binary potential and a lower confidence in accurate comparisons.

Flow then proceeds to decision step 512. In embodiments, the binary potential is calculated for every label pair applicable to the selected nodes. Thus, decision step 512 determines whether there are more pairs of labels applicable to the selected nodes. If there are more pairs of labels, flow branches YES to operation 504. New labels are assigned to the selected nodes and the process of calculating a binary potential is repeated. If the binary potential has been calculated for all combinations of labels for each node, then flow branches NO to decision step 514.

After calculating the binary potential for every possible combination of labels for the selected pair of nodes, flow proceeds in this embodiment to decision step 514 where a determination is made whether more pairs of neighboring nodes exist in the image. If pair of neighboring nodes exists for which the binary potential has not been determined, flow branches YES to step 502, the next pair of neighboring nodes in the first image is selected, and the process of calculating binary potentials is repeated for the next selected pair of nodes on the image. If binary potentials have been calculated for all pairs of neighboring nodes in the first image, flow branches NO and flow terminates.

Figure 6:
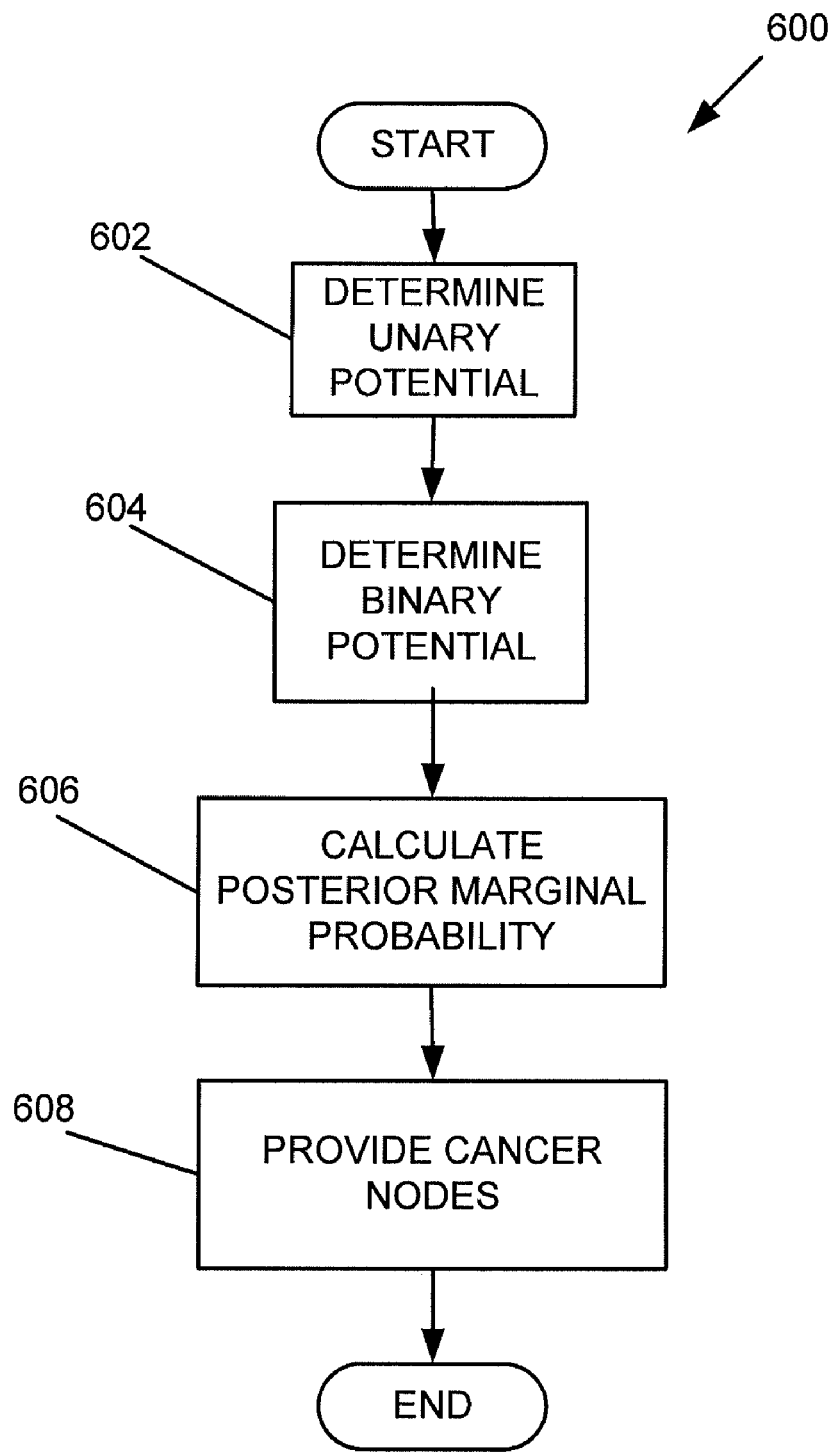
FIG. 6 is a flow diagram representing an embodiment of a method for determining the probability of a lesion or cancer using CRF.

FIG. 6 is an illustration of a flow diagram representing an embodiment of a method 600 for determining the probability of a lesion or cancer using CRF as a probability model. Flow begins at operation 602 where the unary potential is calculated for each node. The calculation of the unary potential was previously explained with reference to FIG. 4. Flow then proceeds to operation 604 where the method calculates the binary potential of each pair of neighboring nodes. Calculation of the binary potential was previously explained with reference to FIG. 5. After calculating the unary and binary potential, flow proceeds to calculate Posterior Marginal Probability operation 606 where the calculated potentials are used as inputs into a CRF model in order to calculate a Posterior Marginal Probability of cancer in each node. In embodiments, the iterative algorithm makes use of different divisions (or "cuttings") of a CRF graph (which consists of nodes corresponding to the first image and edges between neighboring nodes, such as nodes 106 and 108 and edge 110) into a sequence of acyclic subgraphs. In one embodiment, the subgraphs may comprise divisions along vertical or horizontal lines. In embodiments, one iteration of the algorithm consists of a sequence of calculations upon each subgraph in turn. The calculation proceeds under the assumption that an approximation of the Posterior Marginal Probabilities of nodes in the remaining part of the graph has already been calculated. In other embodiments, versions of the algorithms that calculate Posterior Max-Marginal Probabilities and/or the most probable label assignments assume that the most probable labels have already been assigned and fixed to the remaining part of the graph. Under these assumptions, the algorithm makes use of the acyclicity of chosen subgraph and of the fact that a Dynamic Programming method can efficiently and exactly calculate the Posterior Marginal Probability (or the most probable label assignment) for any acyclic subgraph. After applying a Dynamic Programming method to the subgraph (e.g., a horizontal line across the image), the calculated values are stored and used in calculations upon the next subgraph (e.g., the next horizontal line). In embodiments, the iterations are repeated for all subgraphs in a division (e.g., all horizontal lines). In other embodiments, iterations of the algorithm may alternate between different divisions, for instance, after completing an iteration upon a division comprising horizontal lines, the next iteration is performed upon a division made up of vertical lines. The use of Dynamic Programming for large acyclic (e.g., linear) subgraphs allows for a substantial reduction in the number of iterations necessary to perform convergence comparisons using other algorithms known in the art (e.g., Loopy Belief Propagation algorithm and Iterative Conditional Mode algorithm).

Flow then proceeds to provide cancer nodes operation 608.

The Posterior Marginal Probability distribution of labels in a node calculated in operation 606 is used to determine a best classification label for each node. In one embodiment the best classification label can be defined as classification part of the label that maximizes Posterior Marginal Probability function in a given node. In other embodiments, Posterior Marginal Probability distribution of labels for each node can be used to obtain a Posterior Marginal Probability of cancer for each node by marginalizing over all possible mappings and over all possible cancer assignments in corresponding nodes on the other image. The Posterior Marginal Probability of cancer may be used to classify a node as cancer if the latter probability is greater than a predetermined threshold. In an embodiment, the predetermined threshold may be determined by an application, by a user, or through the use of experimental data. The determination of best classification ensures that factors such as the comparison of a node to all possible corresponding nodes on a second image, the comparison of a node to features of nearby nodes on the same image (e.g., the local cancer recognizer), and the comparison of nearby labels are accounted for when assigning a best classification to each node.

Figure 7:
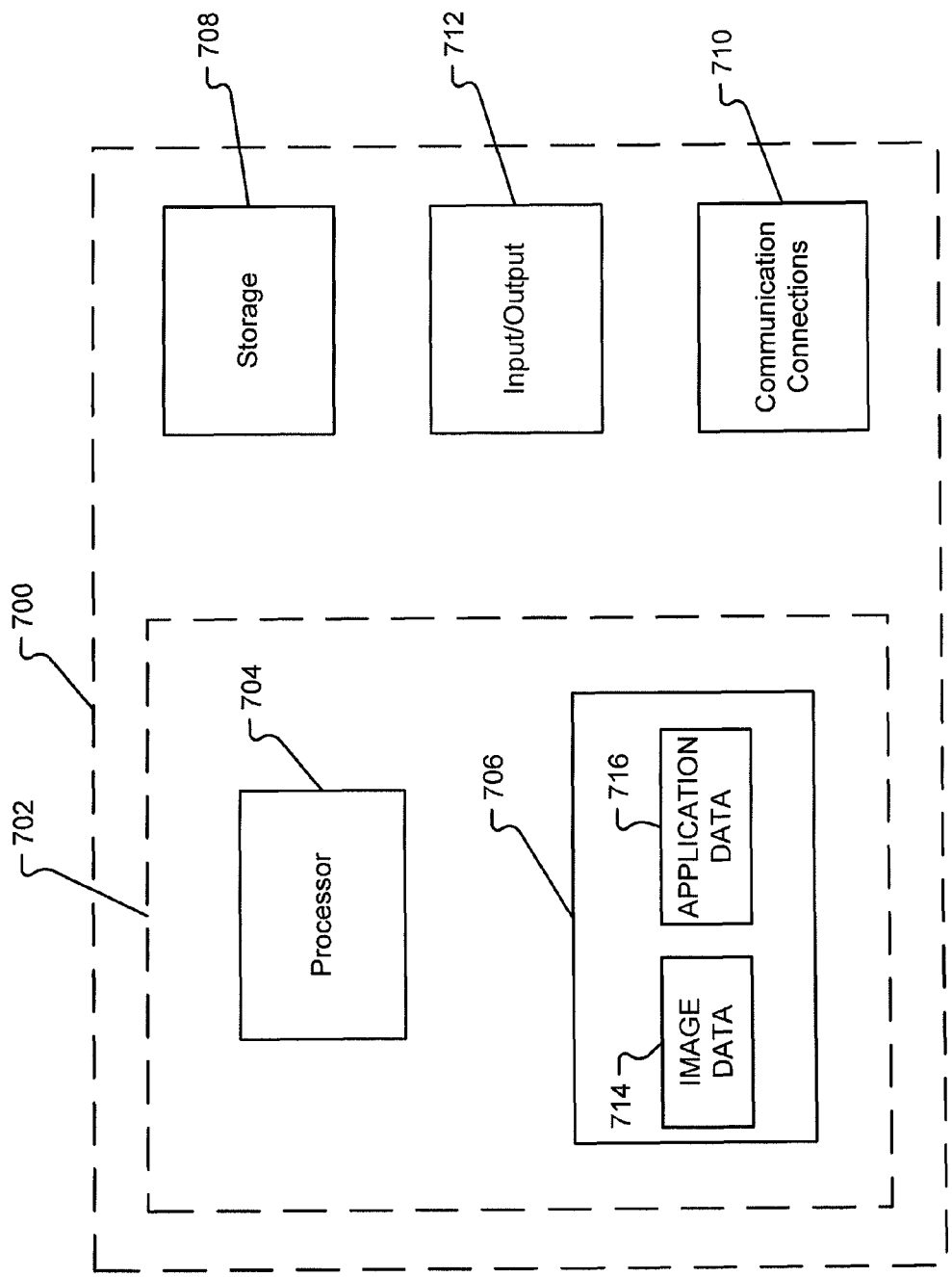
FIG. 7 is a functional diagram illustrating a computer environment and computer system operable to execute embodiments.

With reference to FIG. 7, an embodiment of a computing environment for implementing the various embodiments described herein includes a computer system, such as computer system 700. Any and all components of the described embodiments may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 700 comprises at least one processing unit or processor 704 and system memory 706. The most basic configuration of the computer system 700 is illustrated in FIG. 7 by dashed line 702. In some embodiments, one or more components of the described system are loaded into system memory 706 and executed by the processing unit 704 from system memory 706. Depending on the exact configuration and type of computer system 700, system memory 706 may be volatile (such as RAM), non-volatile (such as ROM, flash memory, etc.), or some combination of the two.

Additionally, computer system 700 may also have additional features/functionality. For example, computer system 700 includes additional storage media 708, such as removable and/or non-removable storage, including, but not limited to, magnetic or optical disks or tape. In some embodiments, software or executable code and any data used for the described system is permanently stored in storage media 708. Storage media 708 includes volatile and non-volatile, removable and non-removable media implemented in any method or technology for storage of information such as computer readable instructions, data structures, program modules, or other data. In embodiments, mammogram images and/or results of probability determination are stored in storage media 708.

System memory 706 and storage media 708 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information and which is accessed by computer system 700 and processor 704. Any such computer storage media may be part of computer system 700. In some embodiments, mammogram images and/or results of probability determination are stored in system memory 706. In embodiments, system memory 706 and/or storage media 708 stores data used to perform the methods or form the system(s) disclosed herein, such as unary potential data, binary potential data, probability distributions, etc. In embodiments, system memory 706 would store information such as image data 714 and application data 716. In embodiments, image data 714 may contain actual representations of an image, such as a first mammogram image 202 or a second mammogram image 208 (FIG. 2). Application data 716, in embodiments, stores the procedures necessary to perform the disclosed methods and systems. For example, application data 716 may include functions or processes for calculating unary and binary potentials, functions or processes for performing the iterative algorithm, and/or functions or processes for the CRF model.

Computer system 700 may also contain communications connection(s) 710 that allow the device to communicate with other devices. Communication connection(s) 710 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an embodiment, mammogram images and or determinations of probability results may be transmitted over communications connection(s) 710.

In some embodiments, computer system 700 also includes input and output connections 712, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to the input and output connections 712 are used to display the information as described herein. All these devices are well known in the art and need not be discussed at length here.

In some embodiments, the component described herein comprise such modules or instructions executable by computer system 700 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 700 is part of a network that stores data in remote storage media for use by the computer system 700.

An illustration of an embodiment of the method and system at work will aid in fully understanding the invention. The following description is intended to provide an example of an embodiment of the disclosure and not to limit the disclosure in any way. An application residing on a computer system, such as computer system 700 is used to analyze mammograms to determine the likelihood of the presence of cancer.

Two images, such as a first mammogram image 202 and a second mammogram image 208 are inputted into the application. The application proceeds to divide the images into distinct nodes for analysis. In a preferred embodiment, each pixel used to display the picture corresponds to a node on the image.

Once the application divides the images into nodes, it begins an analysis on every node of the first and second image. In an embodiment, the analysis comprises multiple calculations for each node in the image. In an embodiment, the calculations consist of 1.) applying all applicable classification labels to each node of the images; 2.) mapping nodes of the first image to nodes of the second image; 3.) comparing every classification label and mapping applied to a node to the classification labels and mappings applied to surround nodes on the same image; 4.) comparing features in the vicinity of a node to typical cancer features; 5.) comparing features in the vicinity of a node from the first image (e.g., the surrounding neighborhood) with features in the vicinity of the node from the second image which results from mapping of the first node; 6.) calculating a unary potential for every label, which consists of classification label and mapping label, for each node; 7.) calculating a binary potential for every combination of labels applied to each pair of neighboring nodes. All the calculated information is then input into a CRF model and an algorithm for calculating Posterior Marginal Probability of labels for each node is applied. An inference about existence of cancer in one or both images as well as the location the cancer on these images is made based upon the probability distribution. In embodiments, the location of cancer is indicated on an image and displayed for a human analysis. In other embodiments, data produced by the disclosed methods and systems are provided to another application for further analysis. While aspects of the present disclosure have been described as a computer software application that resides in computer memory or storage, one skilled in the art will appreciate that aspects of the disclosure can also be performed by logical hardware components.

This disclosure described some embodiments of the present invention with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present invention. Therefore, the specific structure, acts, or media are disclosed only as illustrative embodiments. The invention is defined by the appended claims.

What is claimed is:

1. A computer implemented method for determining a probability distribution of a classification of labels for nodes of a first image by comparing the first image to a second image, the computer implemented method comprising:
   a. defining a set of labels for each node in a plurality of nodes on the first image wherein a label of the set of labels indicates a corresponding node on the second image, a classification of a current node on the first image, and a classification of the corresponding node on the second image;
   b. calculating local descriptive information for multiple mappings between, and multiple classification assignments of, the plurality of nodes of the first image and corresponding nodes on the second image;
   c. inputting at least some of the descriptive information into a probabilistic model, wherein the probabilistic model accounts for classification assignments of the current node combined with different variants of corresponding nodes on the second image;
   d. determining one or more probabilities of classification for at least some of the nodes; and
   e. providing the determined probabilities of classification.

2. The computer implemented method of claim 1, wherein calculating descriptive information further comprises determining a unary potential for at least some of the plurality of nodes of the first image, wherein the unary potential is dependent upon labels applied to the plurality of nodes and determining a binary potential between at least some of the plurality of nodes, wherein the binary potential is dependent upon a pair of labels.

3. The computer implemented method of claim 2, wherein determining a unary potential for labels applied to at least some of the plurality of nodes further comprises:
   determining the unary potential of a node on the first image if the node or the corresponding node on the second image is labeled as cancer; and
   determining the unary potential of the node on the first image if the node and the corresponding node on the second image are labeled as normal.

4. The computer implemented method of claim 3, wherein determining the unary potential of the node on the first image if the node or the corresponding node on the second image is labeled as cancer further comprises:
   comparing values of features associated with the node and the corresponding node on the second image with typical cancer features; and
   penalizing a label assigned to the node if the feature values are atypical.

5. The computer implemented method of claim 4, wherein the features associated with a node comprise at least one of an intensity, a gradient of the intensity, and a contrast.

6. The computer implemented method of claim 3, wherein determining the unary potential of the node on the first image if the node and the corresponding node on the second image are labeled as normal further comprises:
   comparing features associated with the node on the first image and the corresponding node on the second image; and
   penalizing the label applied to the first node for dissimilarity between the features associated with the first node and the second node.

7. The computer implemented method of claim 6, wherein the features associated with a node comprise at least one of an intensity, a gradient of the intensity, and a contrast.

8. The computer implemented method of claim 2, wherein determining the probability distribution further comprises computing the binary potential for a pair of neighboring nodes in the first image and a pair of labels applied to the pair of neighboring nodes.

9. The computer implemented method of claim 8, wherein computing the binary potential further comprises:
   penalizing the pair of labels applied to the neighboring nodes for dissimilarity in the mapping parts of the pair labels; and penalizing the pair of labels applied to the pair of neighboring nodes for dissimilarity in the classification parts of the pair of labels.

10. The computer implemented method of claim 1, wherein the probabilistic model is a Conditional Random Field probabilistic model.

11. The computer implemented method of claim 1, wherein the step of determining one or more probabilities comprises estimating Posterior Marginal Probability for each label applied to each node of the first image in the framework of a Conditional Random Field model.

12. The computer implemented method of claim 1, wherein the step of determining probabilities comprises calculating a Posterior Marginal Probability of a classification in each node by marginalizing over all possible mappings and over all possible classifications of corresponding nodes on the other image.

13. A computer storage media not consisting of a propagated data signal, the computer storage media encoding a computer program of instructions that, when executed by at least one processor, perform a method of determining a probability distribution of labels for first and second mammogram images, the method comprising:
   determining a probability distribution of labels for nodes in the first image, wherein the step of determining the probability distribution comprises:
   a. defining a set of possible labels of a plurality of nodes on the first image, wherein each label comprises a classification part and a mapping part;
   b. determining a unary potential for each node of the first image, wherein determining the unary potential comprises:
      i. determining the unary potential of a first node on the first image for labels classifying the first node or a corresponding node on the second image as cancer, wherein the unary potential is derived by comparing values of features associated with the first node on the first image or the corresponding node on the second image with at least one known value and penalizing a label assigned to the first node if feature values are atypical compared to the at least one known value; and
      ii. determining the unary potential of the first node on the first image for labels classifying the first node and the corresponding node on the second image as normal, wherein the unary potential is derived by comparing features associated with the first node and the corresponding node on the second image and penalizing a label assigned to the first node for dissimilarity between these features;
   c. determining a binary potential for a pair of neighboring nodes in the first image wherein determining the binary potential for the pair of neighboring nodes and a pair of combined labels applied to the pair of neighboring nodes comprises penalizing the pair of combined labels applied to the neighboring nodes for dissimilarity in the mapping parts of the pair of labels and penalizing the pair of labels applied to the pair of neighboring nodes for dissimilarity in the classification parts of the pair of labels;
   d. inputting results derived from the calculating the unary and binary potentials into a probabilistic model, wherein the probabilistic model is a Conditional Random Field model; and
   e. computing the probability of cancer in each node by estimating Posterior Marginal Probability for each label applied to each node in the framework of the Conditional Random Field model and then marginalizing over all possible mappings of the node and over labels of its corresponding nodes; and
   providing the probable cancer regions.

14. The computer storage media of claim 13, wherein the two mammogram images comprise a first mammogram image of a breast and a second mammogram image comprising one of an image of the breast taken at a later date or an image of an opposite breast.

* * * * *